(12) United States Patent
Kishimoto

(10) Patent No.: US 8,854,650 B2
(45) Date of Patent: Oct. 7, 2014

(54) NETWORK PRINTING SYSTEM EXECUTING PRINTING BY COMPARING CERTIFICATION INFORMATION IN A DATABASE

(75) Inventor: Norihisa Kishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 13/592,945

(22) Filed: Aug. 23, 2012

(65) Prior Publication Data

US 2013/0063760 A1    Mar. 14, 2013

(30) Foreign Application Priority Data

Sep. 8, 2011    (JP) ................................. 2011-196501

(51) Int. Cl.
- *G06K 15/00* (2006.01)
- *G06F 21/60* (2013.01)
- *G06F 21/33* (2013.01)
- *H04L 29/06* (2006.01)

(52) U.S. Cl.
CPC .............. *G06F 21/608* (2013.01); *G06F 21/33* (2013.01); *H04L 63/0823* (2013.01)
USPC ......... 358/1.14; 358/1.15; 713/171; 713/168; 713/175; 726/4; 726/10; 726/5

(58) Field of Classification Search
None
See application file for complete search history.

(56) References Cited

U.S. PATENT DOCUMENTS

| | | | |
|---|---|---|---|
| 6,631,008 B2 * | 10/2003 | Aoki | 358/1.15 |
| 7,373,503 B2 * | 5/2008 | Nakano et al. | 713/158 |
| 8,537,395 B2 * | 9/2013 | Shozaki | 358/1.15 |

OTHER PUBLICATIONS

Chan, Shannon, et al (Feb. 2006). Devices Profile for Web Services. Retrieved Aug. 29, 2011 from http://specs.xmlsoap.org/ws/2006/02/devprof/devicesprofile.pdf.

Microsoft Corporation. Secure WSD Device Development. Retrieved Aug. 29, 2011 from http://msdn.microsoft.com/en-us/library/bb204786(v=VS.85).aspx.

* cited by examiner

*Primary Examiner* — Paul F Payer

(74) *Attorney, Agent, or Firm* — Fitzpatrick, Cella, Harper & Scinto

(57) ABSTRACT

In a system including a client, a print server, an image forming device and a database, when the print server verifies a certificate transmitted from the image forming device upon performing TLS communication, verification of certificates that are registered in advance with the database is accelerated. A search key, which is for acquiring information of a desired image forming device from data stored in the database, is set in the print server. Certificate information is registered with the database in association with the search key. In this way, the certificate information can be searched for using the search key and verification can be accelerated.

10 Claims, 12 Drawing Sheets

F I G. 3
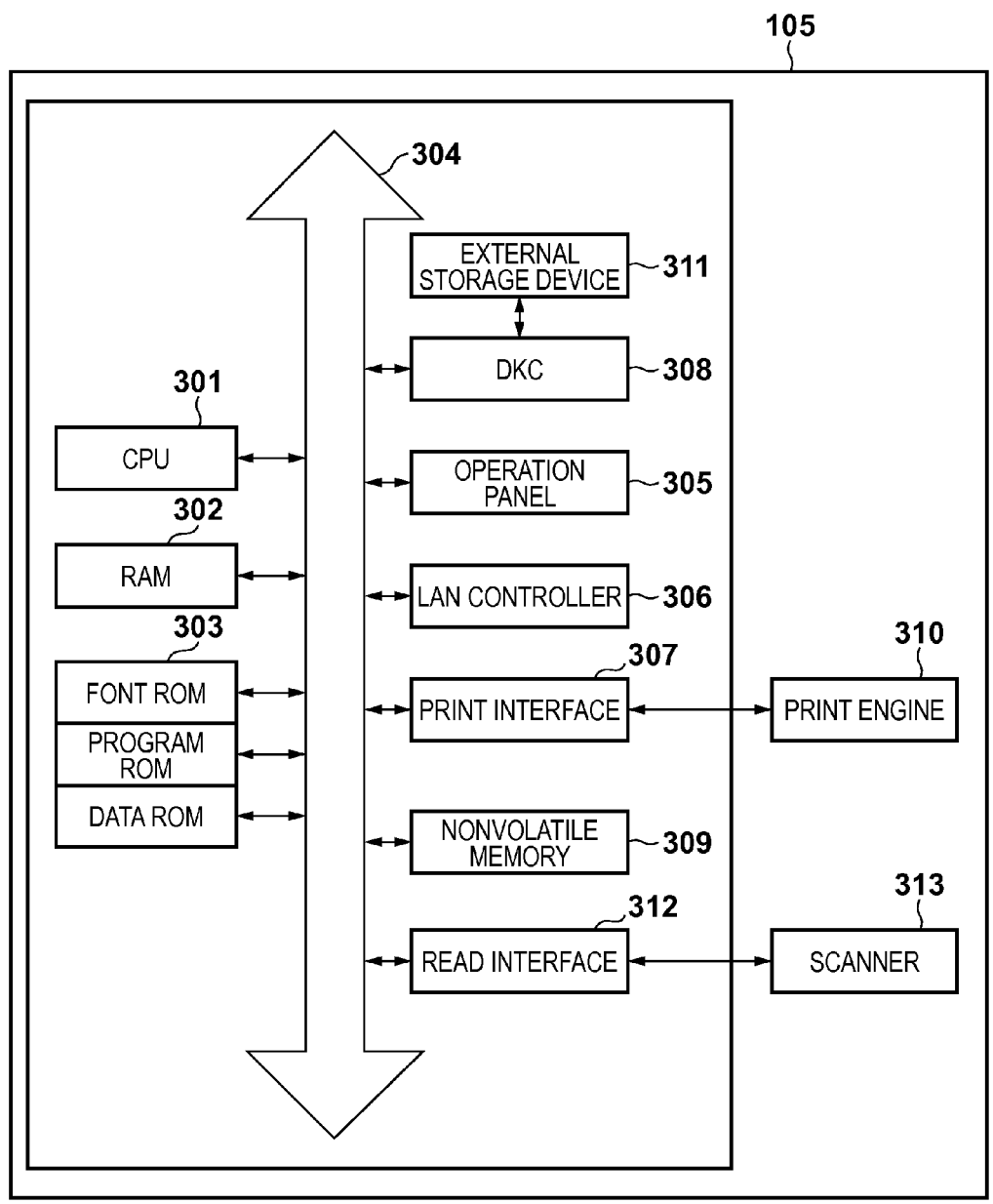

FIG. 7
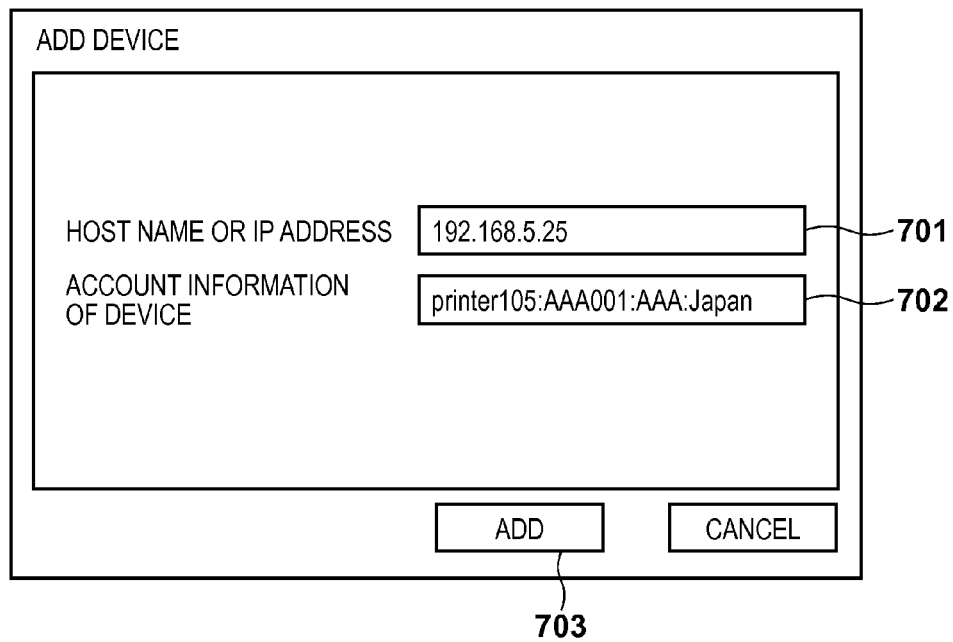
FIG. 8
| DEVICE NAME | IP ADDRESS OF DEVICE | ACCOUNT INFORMATION |
|---|---|---|
| DEVICE1 | 192.168.5.25 | printer105:AAA001:AAA:Japan |
| DEVICE2 | 192.168.5.26 | printer106:AAA001:AAA:Japan |
| DEVICE3 | 192.168.5.27 | printer107:AAA002:AAA:Japan |
| ... | | |
FIG. 9
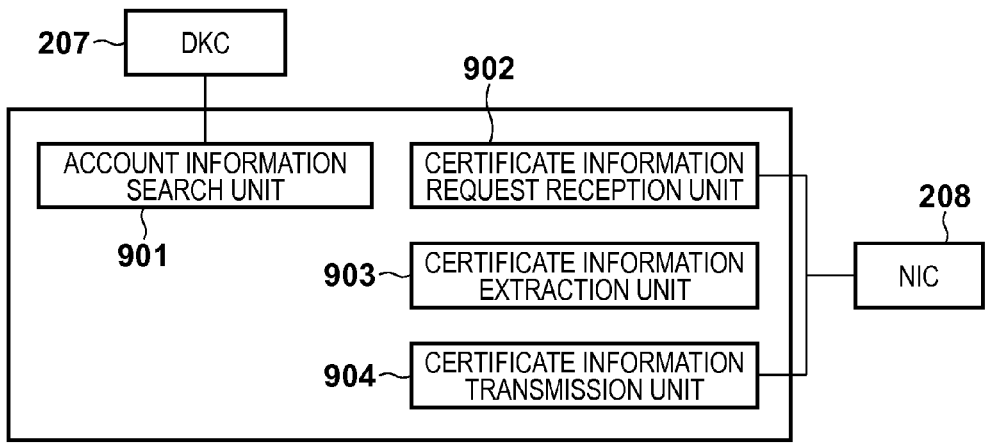

| ATTRIBUTE | VALUE |
|---|---|
| VERSION | 3 |
| SERIAL NUMBER | AB87D7 |
| SIGNATURE ALGORITHM | RSA-SHA1 |
| ISSUER | AAA co |
| EXPIRATION DATE | 2011/9/19 |
| SUBJECT | Japan Tokyo |
| CN | 192.168.5.25 |
| FRIENDLY NAME | printer105:AAA001:AAA:Japan |

1301

NETWORK PRINTING SYSTEM EXECUTING PRINTING BY COMPARING CERTIFICATION INFORMATION IN A DATABASE

BACKGROUND OF THE INVENTION

1. Field of the Invention

The present invention relates to a network system for secure printing via a network.

2. Description of the Related Art

Conventionally, printing can be executed from a client PC via a network connected to a device, such as an image forming device, using communication protocols for web services and the like. There are already standard technologies serving as specifications for executing this processing, such as Web Services on Devices (WSD) *[1] proposed by Microsoft Corporation.

*[1]: CHAN, Shannon, et al (February, 2006). *Devices Profile for Web Services*. Retrieved Aug. 29, 2011 from http://specs.xmlsoap.org/ws/2006/02/devprof/devicesprofile.pdf Furthermore, specifications *[2] for secure WSD have been proposed to preserve the security of network data transmitted from and received by printing means using such web services. Secure WSD employs secure communication using Transport Layer Security (TLS) defined in RFC 2246 and the like.

*[2]: Microsoft Corporation. *Secure WSD Device Development*. Retrieved Aug. 29, 2011 from http://msdn.microsoft.com/en-us/library/bb204786(v=VS.85).aspx TLS prevents falsification and sniffing of network data by encrypting the network data, and prevents spoofing through certificate verification. In certificate verification, the validity of a server certificate is ensured by a public certificate authority applying a signature to the server certificate. A client stores a CA certificate of the certificate authority, and a server stores a server certificate. The server transmits the server certificate to the client so that the client verifies the validity of the server.

Although a certificate authority is generally a trusted certificate authority, it is possible to use only the encrypted communication function of TLS with the issuance of a server certificate generated using a self-signature. Furthermore, although a certificate authority is generally a trusted certificate authority, it is possible to verify whether or not the server is a true and correct server by installing, in advance, a CA certificate generated using a self-signature on the client.

In order to verify the validity of a server through certificate verification using TLS, it is necessary for the client to pre-store a CA certificate chained to a server certificate, that is to say, a CA certificate of a certificate authority (CA organization) that issued the server certificate. Therefore, in the case of a client that has many occasions to access servers which conduct verification using self-signatures, the client needs to store CA certificates that match those servers in number. Upon crosschecking a server certificate, the client needs to search a large number of CA certificates for a CA certificate including certificate information that matches the server certificate. This could take time because each one of the CA certificates is checked to determine whether or not it matches the server certificate. In a system where CA certificates are shared in a network by being stored in, for example, a directory server, all the CA certificates of servers accessed by clients belonging to the network are stored in the directory server, and therefore the search is conducted from among a very large number of certificates. The amount of time required for this search could cause delay in crosschecking of the certificates.

SUMMARY OF THE INVENTION

The present invention has been conceived in view of the conventional situation described above, and provides an image forming system that solves the above problem and enables prompt crosschecking.

The present invention includes the following configuration.

In a network printing system, a print server, an image forming device and a database are connected via a network. First certificate information issued by the image forming device is registered with the database in advance. When the print server executes printing using the image forming device, second certificate information issued by the image forming device in response to a request is compared with the first certificate information issued by the image forming device and registered with the database, and the printing is started using the image forming device if the second certificate information matches the first certificate information. The first certificate information is registered with the database as an entry associated with key information that serves as a key used in searching for the first certificate information. The print server stores the key information registered with the database in association with the image forming device, and when executing printing using the image forming device, transmits the key information associated with the image forming device to the database and causes the database to search for the first certificate information. The database transmits the first certificate information identified by the key information to the print server. The print server compares the first certificate information received from the database with the second certificate information received from the image forming device, and starts printing using the image forming device in accordance with a result of comparison.

In another aspect, the present invention includes the following configuration.

In a network printing system, a print server, an image forming device and a database are connected via a network. First certificate information issued by the image forming device is registered with the database in advance. When the print server executes printing using the image forming device, second certificate information issued by the image forming device in response to a request is compared with the first certificate information issued by the image forming device and registered with the database, and the printing is started using the image forming device if the second certificate information matches the first certificate information. The first certificate information is registered with the database as an entry associated with key information that serves as a key used in searching for the first certificate information. The print server stores the key information registered with the database in association with the image forming device, and when executing printing using the image forming device, transmits the key information associated with the image forming device together with the second certificate information received from the image forming device to the database and causes the database to compare the first certificate information with the second certificate information. The database compares the first certificate information identified by the key information with the second certificate information and transmits a result of the comparison to the print server. The print server starts printing using the image forming device in accordance with the result of the comparison received from the database.

In another aspect, the present invention includes the following configuration.

A print server is included in a network printing system in which the print server, an image forming device and a database are connected via a network. First certificate information issued by the image forming device is registered with the database in advance. When the print server executes printing using the image forming device, second certificate information issued by the image forming device in response to a request is compared with the first certificate information issued by the image forming device and registered with the database, and the printing is started using the image forming device if the second certificate information matches the first certificate information. The first certificate information is registered with the database as an entry associated with key information that serves as a key used in searching for the first certificate information. The print server stores the key information registered with the database in association with the image forming device, and, when executing printing using the image forming device, transmits the key information associated with the image forming device to the database and causes the database to search for the first certificate information. The database transmits the first certificate information identified by the key information to the print server. The print server compares the first certificate information received from the database with the second certificate information received from the image forming device, and starts printing using the image forming device in accordance with a result of comparison.

In another aspect, the present invention includes the following configuration.

A database is included in a network printing system in which a print server, an image forming device and the database are connected via a network. First certificate information issued by the image forming device is registered with the database in advance. When the print server executes printing using the image forming device, second certificate information issued by the image forming device in response to a request is compared with the first certificate information issued by the image forming device and registered with the database, and the printing is started using the image forming device if the second certificate information matches the first certificate information. The first certificate information is registered with the database as an entry associated with key information that serves as a key used in searching for the first certificate information. The print server stores the key information registered with the database in association with the image forming device, and when executing printing using the image forming device, transmits the key information associated with the image forming device to the database and causes the database to search for the first certificate information. The database transmits the first certificate information identified by the key information to the print server. The print server compares the first certificate information received from the database with the second certificate information received from the image forming device, and starts printing using the image forming device in accordance with a result of comparison.

The present invention prevents the risk of spoofing even when TLS communication using self-signatures is performed. Furthermore, even if there are a large number of image forming devices, the amount of time required for verification can be reduced.

Further features of the present invention will become apparent from the following description of exemplary embodiments with reference to the attached drawings.

BRIEF DESCRIPTION OF THE DRAWINGS

FIG. 3 is a block diagram showing a hardware configuration of image forming devices 105, 106 and 107.

FIG. 7 shows a UI screen for adding an image forming device in the print server 103.

FIG. 8 shows a table that is stored in the print server 103 and includes information of devices.

FIG. 9 shows a software configuration of the directory server 104.

DESCRIPTION OF THE EMBODIMENTS

The following describes a network printing system that executes network printing as the best mode for embodying the present invention with reference to the drawings. First, a description is given of a conceivable system for solving the problem.

<Configuration of Printing System>

Figure 1:
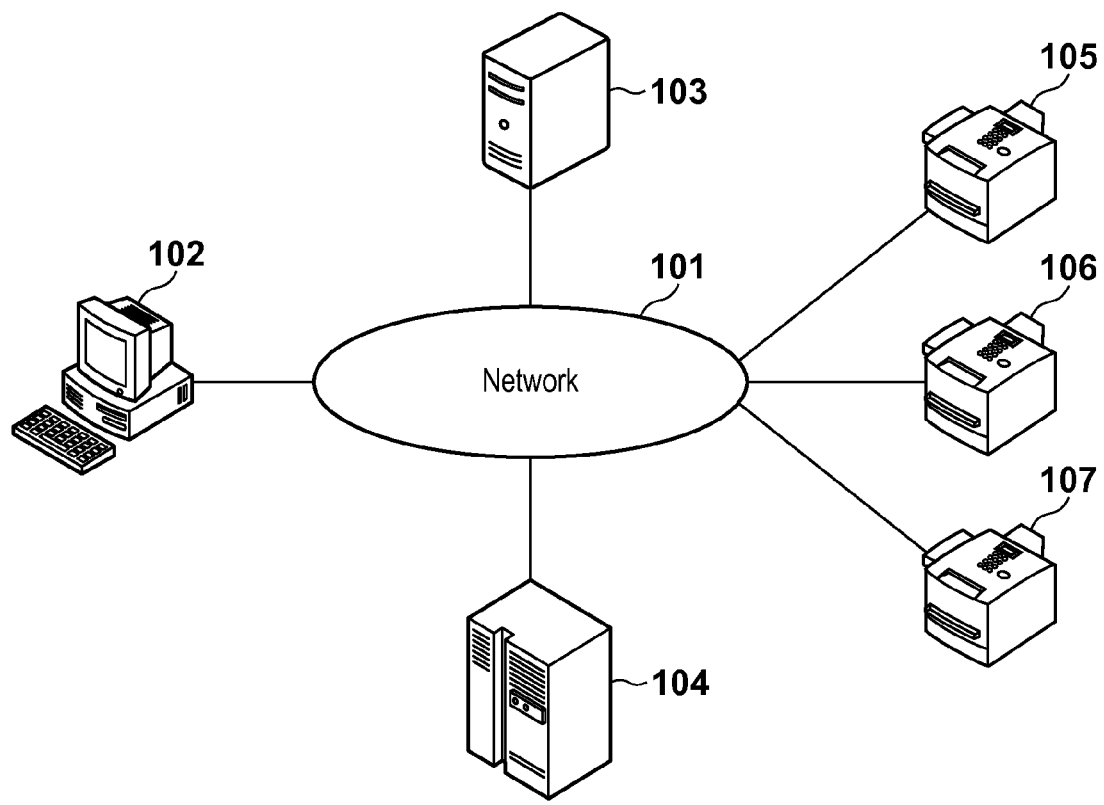
FIG. 1 shows a system configuration of a printing system according to the present invention.

FIG. 1 shows a system configuration of a printing system to which the present invention is applied. In FIG. 1, a client PC 102, a print server 103, a directory server 104, and image forming devices 105, 106 and 107 are connected to a network 101. The network 101 may be an intranet or the Internet accommodating any form of connection, and may mediate between a plurality of networks via mediation devices such as HUBs and routers. In the present embodiment, the network 101 needs to support TLS. The client PC 102 is a device that issues a print request to the print server 103. The print server 103 is a device that, upon receiving the print request from the client PC 102, executes printing using an image forming device desired by the client. The directory server 104 is a device that stores information relating to certificates held by the image forming devices 105, 106 and 107 (the certificates, hash values of the certificates, etc.). Upon receiving a request, the directory server 104 returns the certificate information stored therein in response to the request. The image forming devices 105, 106 and 107 are devices that actually execute printing upon receiving a request (print job) from the print server 103. Note that in the present embodiment, a Lightweight Directory Access Protocol (LDAP) server or an Active Directory (AD) server is used as the directory server 104, unless otherwise noted. Furthermore, the image forming device 105 is used as a representative of the image forming devices. Any printing protocols may be used as long as they can implement secure communication.

<Hardware Configuration of Computer>

Figure 2:
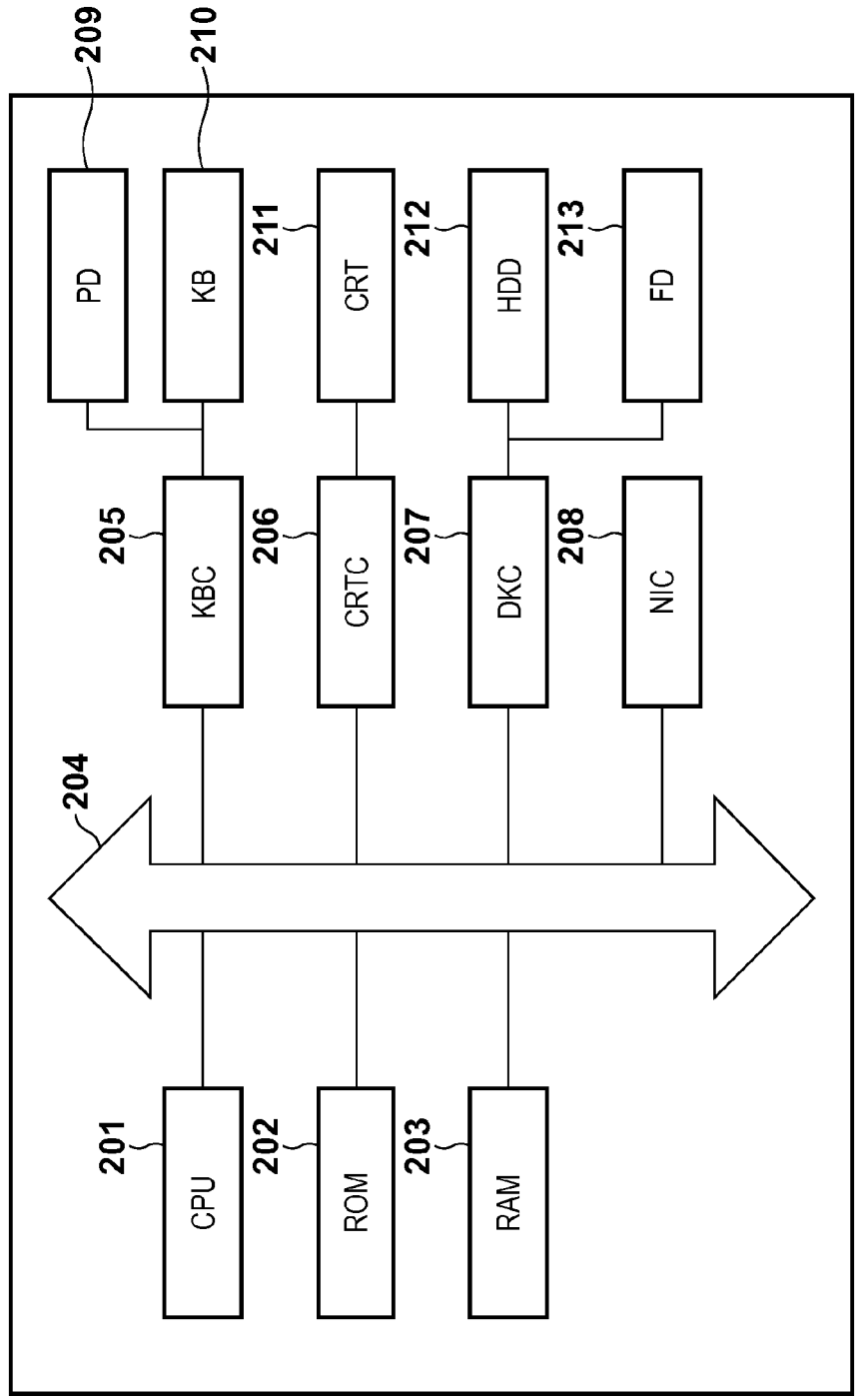
FIG. 2 is a block diagram showing a hardware configuration of a client PC 102, a print server 103 and a directory server 104.

FIG. 2 shows a hardware configuration of a computer that realizes the client PC 102, the print server 103, the directory server 104, or the like. A CPU 201 controls various types of devices connected to a system bus 204. A ROM 202 stores a BIOS and a boot program. A RAM 203 is used as a main storage device for the CPU 201. A keyboard controller (KBC) 205 executes processing related to input of information and the like from a pointing device 209, such as a mouse (registered trademark), and a keyboard 210. A display control unit (CRTC) 206 includes a built-in video memory. It renders images in the video memory in accordance with instructions from the CPU 201, and outputs data of the images rendered in the video memory as a video signal to a CRT display device 211. Although the CRT display device is shown as an example of a display device in FIG. 2, any type of display device may be used, such as a liquid crystal display device. A disk controller (DKC) 207 accesses a hard disk (HDD) 212 and a floppy (registered trademark) disk 213. A network interface card (NIC) 208 connects to the network to perform information communication via the network. Note that the HDD 212 stores, for example, an OS and various types of application programs that operate on the OS. In the above configuration, when the power of the present device is turned on, the CPU 201 reads the OS from the HDD 212 into the RAM 203 in accordance with the boot program stored in the ROM 202, and the present device functions as an information processing device.

<Hardware Configuration of Image Forming Devices>

FIG. 3 shows a hardware configuration of the image forming devices 105, 106 and 107. A CPU 301 controls accesses to various types of devices connected to a system bus 304 as a whole based on control programs stored in a program ROM of a ROM 303 or in an external storage device 311. The CPU 301 also outputs an image signal as output information to a print unit (printer engine) 310 connected via a print interface 307, and controls an image signal input from a read unit (scanner) 313 connected via a read interface 312. The program ROM of the ROM 303 stores, for example, control programs that can be executed by the CPU 301. A font ROM of the ROM 303 stores, for example, font data (including outline font data) that is used in generating the aforementioned output information. A data ROM of the ROM 303 stores, for example, information used on a client computer. The CPU 301 can execute processing for communication with a client computer and devices on the network via a LAN controller unit 306. Typically, a RAM 302 functions as a main memory, a work area, and the like for the CPU 301, and is configured to enable extension of a memory capacity with the use of an optional RAM connected to an additional port (not shown in the figures). The RAM 302 is used as an area for deploying the output information, an area for storing environmental data, and the like. A disk controller (DKC) 308 controls accesses to the external storage device 311, examples of which include a hard disk (HDD) and an IC card. The hard disk stores application programs, font data, form data, and the like. The hard disk is also used as a job storage area for temporarily spooling a print job and controlling the spooled job from the outside. The hard disk is also used as a BOX data storage area for storing image data read from the scanner 313 and image data of a print job as BOX data, referencing the BOX data from the network, and executing the printing. In the present embodiment, HDD is used as the external storage device, and the external storage device holds various types of logs such as job logs and image logs. A user can input various types of information to an operation panel 305 via software keys. The number of the aforementioned external storage device is not limited to one. One or more external storage devices may be provided and configured to connect to a plurality of external memories storing optional font cards in addition to installed fonts, and programs that interpret different printer control languages. A nonvolatile memory 309 stores various types of configuration information set via the operation panel 305.

Although not shown in the figures, the device 104 may optionally be provided with various types of extension devices such as a finisher with stapling and sorting functions and a duplex device that realizes a duplex printing function. Operations of these extension devices are controlled by the CPU 301.

Figure 4:
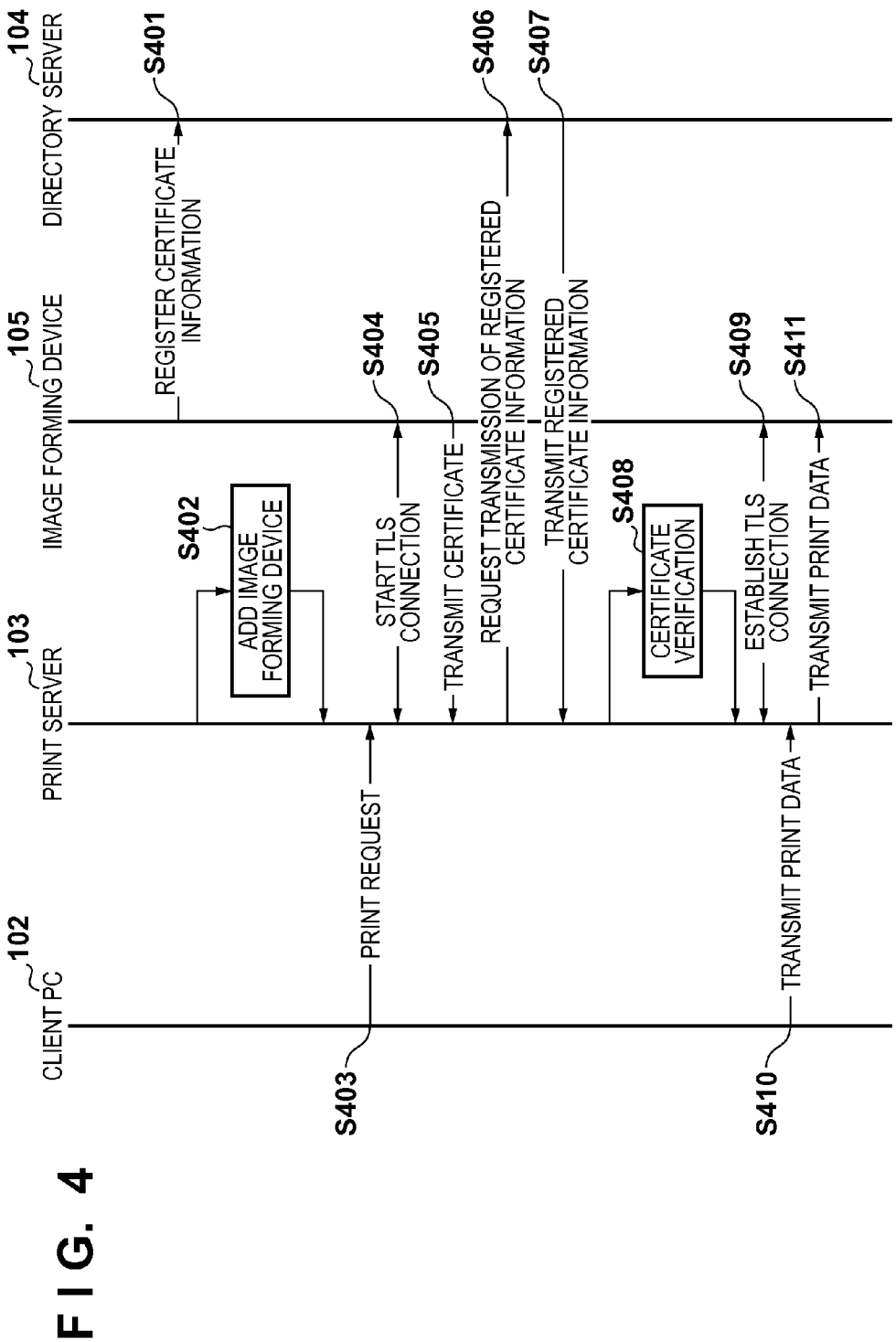
FIG. 4 is a sequence diagram showing a processing flow of a technique described in an embodiment.
Figure 5:
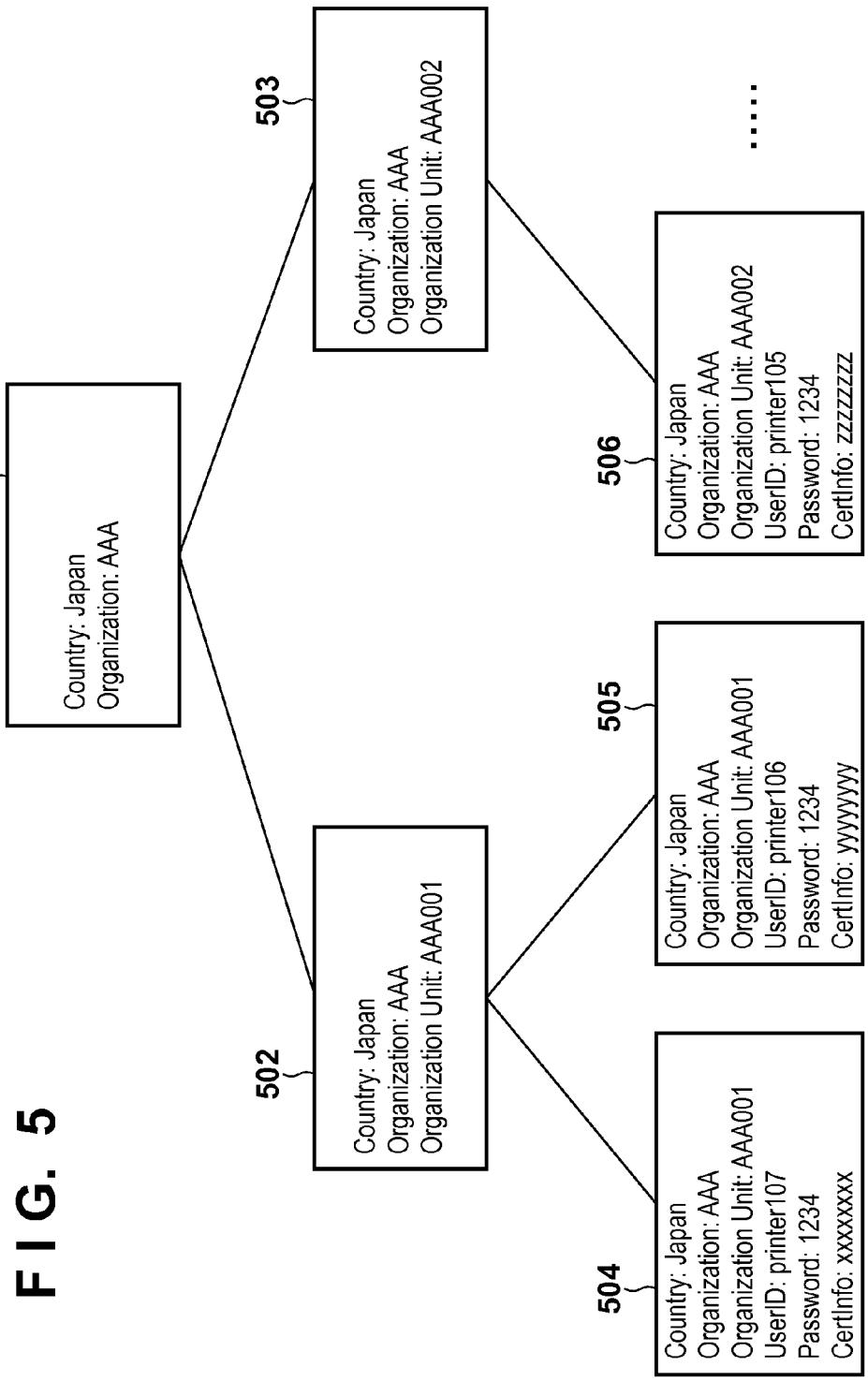
FIG. 5 shows a data structure of the directory server 104.

A description is now given of processing executed by the system to embody the present invention with reference to a sequence diagram of FIG. 4 and a data structure diagram of FIG. 5. Although the image forming device 105 is used in the following description as a representative example, other image forming devices execute the same processing.

<Sequence of Processing of System>

When configuring the settings of the image forming device 105, a certificate is set for secure communication with the print server 103. At this time, the image forming device 105 registers information relating to the certificate with the directory server 104 (S401). This first certificate information is equivalent to a CA certificate. Hereinafter, secure communication is referred to as TLS unless otherwise noted. In the present embodiment, the directory server 104 manages stored information under the data structure shown in FIG. 5. Alternatively, the directory server 104 may manage stored information under other data structures. The data structure shown in FIG. 5 will be described later. Next, the print server 103 installs thereon the image forming device 105 so as to mediate between the client PC 102 and the image forming device 105 (S402). More specifically, the print server 103 registers the image forming device 105 as a device that is connected to the network and has an image forming function, and installs a device driver thereof. The above procedures may be carried out any time prior to procedures for print processing described below.

Next, a description is given of processing for issuing a print request from the client PC 102. The client PC 102 issues a print request to the print server 103 so as to execute printing using the image forming device 105 (S403). Upon receiving this request, the print server 103 attempts to connect to the image forming device 105 using TLS so as to transfer the print request to the image forming device 105 (S404). At the time of this connection, the image forming device 105 transmits a certificate to the print server 103 (S405). This second certificate information is equivalent to a server certificate. Upon receiving the certificate, the print server 103 attempts to verify the certificate. The verification method is as follows. The print server 103 requests the directory server 104 to transmit certificate information registered therewith (S406), and in response, the directory server 104 transmits all the certificate information (504, 505, 506, ... ) registered therewith (S407). The print server 103 conducts certificate verification by comparing the certificate information received from the directory server 104 with the certificate information transmitted from the image forming device (S408). In the comparison of S408, the print server 103 searches all the certificate information (504, 505, 506, ... ) registered with the directory server 104 for the one that matches the certificate information received from the image forming device. When the print server 103 finds the one that matches, the verification succeeds. When the print server 103 does not find the one that matches, the verification fails. When the above verification has succeeded, the establishment of TLS connection between the print server and the image forming device is completed. From that point, communication between the print server 103 and the image forming device 105 is encrypted using TLS. The print server 103 encrypts print data transmitted from the client PC 102 in S410 and transmits the encrypted print data to the image forming device 105.

In the present embodiment, the print server 103 issues a request for the certificate information to the directory server 104 in S406 and receives the certificate information in S407. Alternatively, the print server 103 may issue a request for the certificate information of the image forming devices as well as verification in S406, and the directory server 104 may conduct the verification and return the result of verification to the print server in S407. Either of the above methods may be employed in the system configuration. However, in the case where the latter method is employed, the print server 103 transmits, to the directory server 104, a request for verification together with the certificate information received from the image forming device. In this case also, the directory server 104 compares the received certificate information with the registered certificate information until the one that matches the received certificate information is found, or until the comparison is made with all the registered certificate information in the case where the one that matches the received certificate information is not found. The directory server 104 transmits the result of comparison to the print server 103. The print server 103 starts the printing using the image forming device if the result of comparison is correct, and does not conduct the printing using the image forming device if the result of comparison is erroneous. This concludes the description of processing of the conceivable system for solving the problem.

FIG. 5 is a data structure diagram showing how account information is managed and held by the directory server 104. In the general directory server 104, the account information is stored and managed under the tree structure shown in FIG. 5, which is stored in the RAM 203 or the HDD 212. Although FIG. 5 shows a hierarchical structure in the order of Organization, Organization Unit and User, any data structure may be used. In FIG. 5, accounts 506, 505 and 504 are associated with the image forming devices 105, 106 and 107, respectively. According to this structure, the account 506 belongs to a level (leaf) below a level 501 representing the topmost organization and a level 503 representing the middle organization. As the account information, a user ID ("UserID" in FIG. 5) and a password are registered. In the present example, information of the certificate that was generated by the image forming device and transmitted to the directory server 104 ("CertInfo" in FIG. 5) is also registered. Note that the example of FIG. 5 shows a part of the accounts. In practice, the accounts of a large number of image forming devices and the accounts of information devices other than the image forming devices are managed as well.

Furthermore, a key that is used in searching this database (DB) of account information for each entry (i.e. the account information 501, 502 and 503 of the devices) includes information of corresponding levels of the tree structure, such as "printer105:AAA002:AAA:Japan". In this way, there is no need to conduct the search by scanning the tree structure. Alternatively, the key used in the search may have other formats. In the present description, information serving as the key used in the search is a part of extended account information, and especially referred to as key account information (or key information) so as to be distinguished from other parts. This key account information may also be referred to as path information as it indicates a path to a leaf node in the database having the tree structure.

In the above-described system, the directory server 104 transmits a message including a large number of certificate information registered therewith. This places load on the directory server 104 as well as the network. Furthermore, in the print server 103 that has received all the certificate information, if the certificate information that the print server 103 is searching for is the last entry, then the number of times the search is conducted increases, which places load on the print server 103.

The following describes embodiments that provide a solution to the above problems. The system configuration of the embodiments is the same as the one described above. Therefore, the following description only provides the parts that differ from the above-described system configuration. Although the configurations and sequences that are the same as in the above description are omitted from the description of the following embodiments, they are encompassed within the inventions described in the following embodiments.

[Embodiment 1]

The system of the present embodiment differs from the above-described system in processing of the print server 103 and the directory server 104. Therefore, the sequence for print processing in the system of the present embodiment partially differs from that of FIG. 4. A description is now given of the software configuration of the print server 103 and the directory server 104 of the present embodiment.

<Software Configuration of Print Server 103>

Figure 6A:
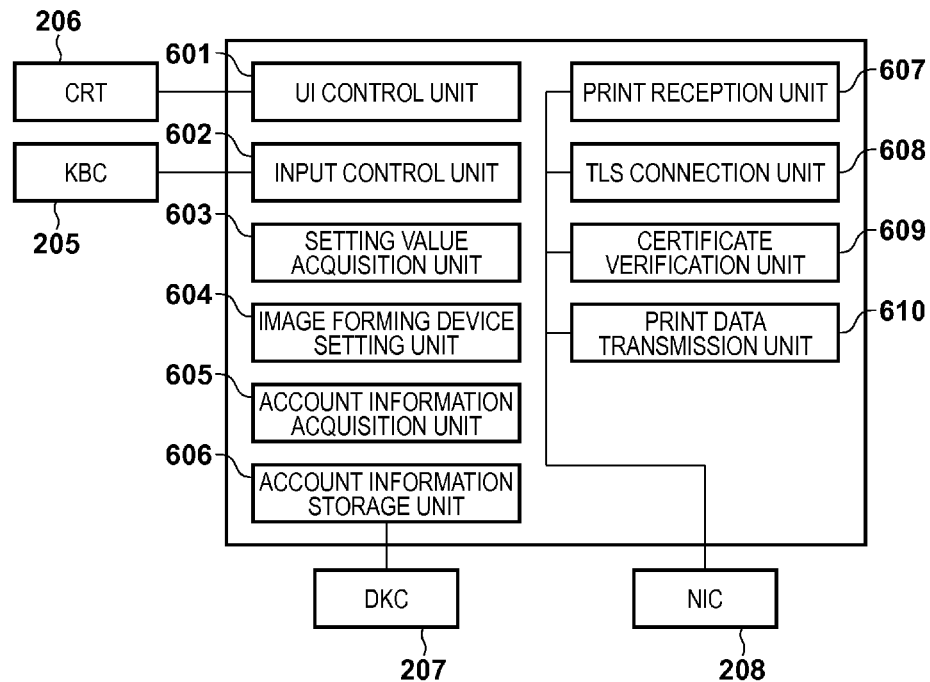
FIG. 6A shows a software configuration of a print server 103 according to Embodiment 1.

FIG. 6A shows a software configuration of the print server 103 according to the present embodiment. A UI control unit 601 is a component that renders a user interface (UI) screen for adding the settings for the image forming device in the print server 103 and displays the rendered screen on the CRT 211 via the CRTC 206. The displayed UI will be described later. An input control unit 602 is a component to which the user (mainly the network administrator) inputs the settings for adding the image forming device. The "components" are realized by program modules and the like executed by the CPU. A setting value acquisition unit 603 is a component that receives values of the settings input to the input control unit 602. An image forming device setting unit 604 is a component that extracts, from the values received by the setting value acquisition unit 603, a part relating to addition of the image forming device, and sets up the image forming device in the print server 103 to place it in a usable state. On the other hand, an account information acquisition unit 605 is a component that extracts, from the values acquired by the setting value acquisition unit 603, account information required for the image forming device to access the directory server. An account information storage unit 606 is a component that stores the extracted account information and information of the image forming device that has been set up into a storage (in the present example, the HDD 212). The information to be stored will be described later. A print reception unit 607 is a component that receives a print request and print data from the client PC 102 through reception of network packets via the NIC 208. A TLS connection unit 608 is a component that controls a process in which the print reception unit receives the print request as well as a process from the start through the end of establishment of the TLS connection with the image forming device. In the course of establishing the TLS connection, the image forming device 105 transmits a certificate to the TLS connection unit 608. A certificate verification unit 609 is a component that verifies the transmitted certificate. The flow of the certificate verification will be described later. A print data transmission unit 610 is a component that encrypts the print data using TLS and transmits the encrypted print data upon establishment of the TLS connection after the certificate verification is normally completed.

FIG. 7 shows a UI screen that is displayed by the UI control unit 601 of the print server 103 when additionally registering the image forming device with the print server 103. It is assumed here that the user has already instructed the additional registration of the image forming device and started to input the values of the settings thereof on the UI screen. In the present example, the user is setting the image forming device 105, and the IP address of the image forming device 105 is 192.168.5.25. An input field 701, which is for adding the image forming device, already exists in a system that precedes the present embodiment described above. An input field 702 is for inputting the account information of the image forming device set in the directory server 104 (in the present example, the key account information mentioned earlier). In the present example, the key account information that is registered with the directory server 104 and serves as a search key relating to the account shown in FIG. 5 is input with a colon that divides between the levels. Alternatively, an input field may be provided for each item, or in a simpler manner, only the user name may be input. Although the directory server 104 is used in the present embodiment, when a database other than the directory server 104 is used, an identifier that serves as a key for the database search (e.g. UUID) is set. These items are stored in the print server 103 in association with the image forming device to be additionally registered.

FIG. 8 is a table including the account information stored in the print server 103. In the present example, the account information set by the user, namely the key account information, is stored together with a device name, an IP address, and the like. Although only three entries are registered in the present example, the entries for all the image forming devices connected to the network are registered in practice.

<Software Configuration of Directory Server 104>

FIG. 9 shows a software configuration of the directory server 104 according to the present embodiment. An account information search unit 901 is a component that searches the tree structure illustrated in FIG. 5 for the target entry using the key account information included in the account information as the search key. A certificate information request reception unit 902 is a component that receives a request from the NIC 208. This request is transmitted by the certificate verification unit 609 of the print server 103 and includes the account information stored therein. A certificate information extraction unit 903 is a component that extracts certificate information stored in association with the account information. The certificate information is, for example, the CertInfo field shown in FIG. 5. A certificate information transmission unit 904 is a component that transmits the certificate information extracted from the account information to the print server 103 via the NIC 208.

<Procedure for Certificate Verification>

Figure 10:
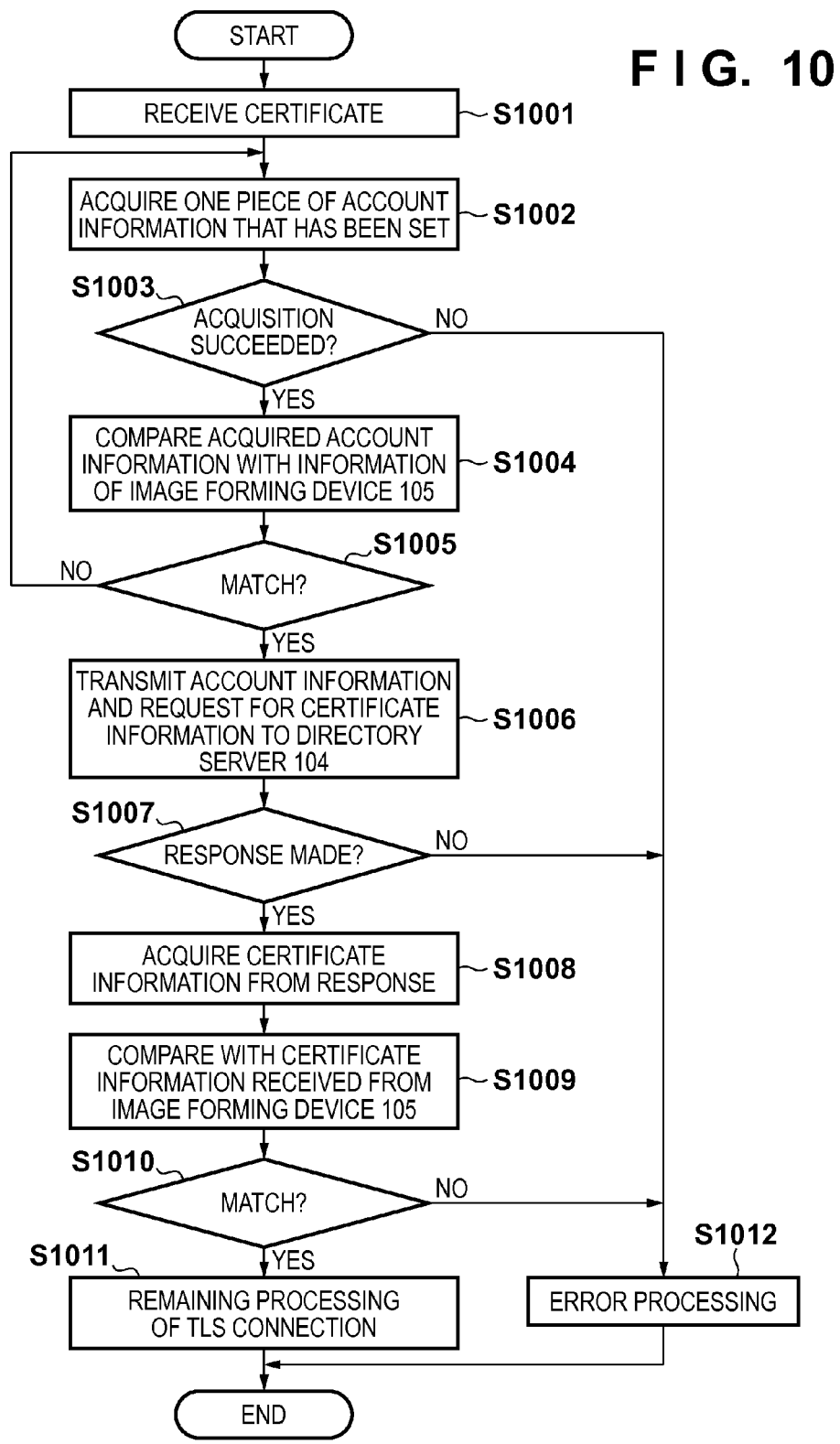
FIG. 10 is a flowchart showing processing of the print server 103.
Figure 11:
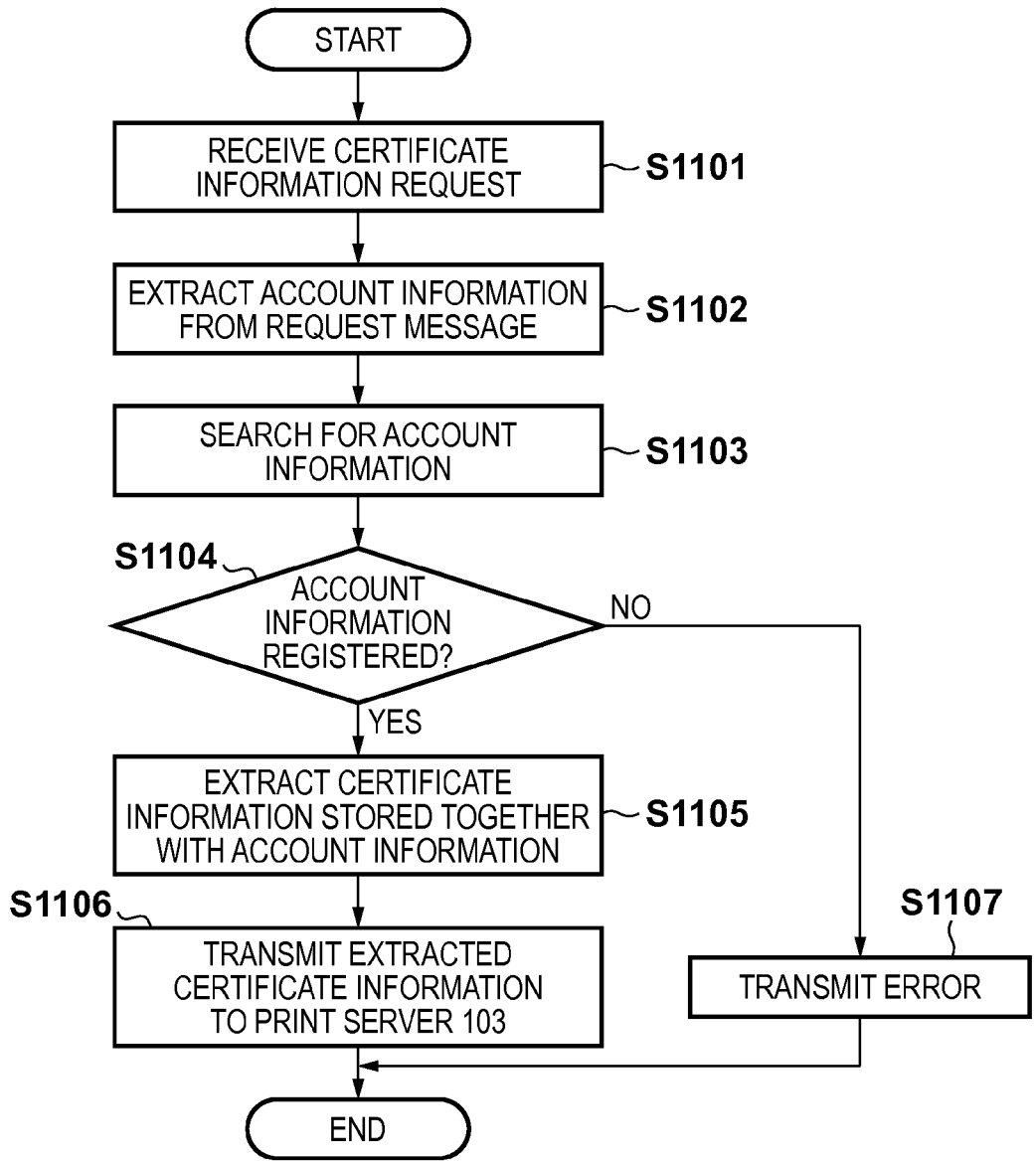
FIG. 11 is a flowchart showing processing of the directory server 104.

A description is now given of a flow in which the print server 103 verifies the certificate received from the image forming device 105 using the directory server 104 in the present invention with reference to flowcharts of FIGS. 10 and 11. FIG. 10 is a flowchart of processing executed by the print server 103, and FIG. 11 is a flowchart of processing executed by the directory server 104.

When the TLS connection unit 608 of the print server 103 receives the certificate issued by the image forming device 105 (S1001), the certificate verification unit 609 verifies the certificate. The flow of verification is as follows. First, the print server 103 acquires the entry, namely the IP address and key account information, of the image forming device used for the printing from the table shown in FIG. 8 stored by the account information storage unit 606 (S1002). When the acquisition has failed, it means that the image forming device 105 is not registered, and therefore error processing is executed (S1012). As the error processing, the connection may be cut at this point, or the connection may be continued. When the entry has been acquired (when the entry is registered with the table), the acquired entry is compared with the IP address and key account information (or one of them) of the image forming device 105 to verify whether or not the acquired entry is the entry of the image forming device 105 (S1004). When the acquired entry is not the entry of the image forming device 105, the acquisition is performed again. When the acquired entry is the entry of the image forming device 105, a request message for certificate information (a certificate information request) is transmitted to the directory server 104 together with the account information including the acquired key account information (S1006). Here, the entirety of the account information is transmitted, including the key account information as well as the user ID and password of the image forming device. However, when the objective is only to identify the image forming device corresponding to the certificate information, only the key account information may be transmitted.

When the certificate information request reception unit 902 of the directory server 104 receives the above request message (S1101), the certificate information extraction unit 903 extracts the account information from the request message (S1102). The target entry is searched for by the account information search unit 901 searching the database shown in FIG. 5 using the extracted account information as a key (S1103). When the target entry is found as a result of the search, the user ID and password are also compared. The search succeeds and the target certificate information is acquired only if they match. When the search has succeeded, the certificate information is extracted from the searched information (S1105), and the certificate information transmission unit 904 transmits a response message including the extracted certificate information to the print server 103 (S1106). On the other hand, when the account information is not registered, error processing is executed (S1107). As the error processing happens, the certificate information transmission unit 904 transmits an error message to the print server 103.

The certificate verification unit 609 of the print server 103 receives the response message transmitted from the directory server 104 (S1007). The certificate verification unit 609 extracts the certificate information from the received response message (S1008) and compares the extracted certificate information with the certificate information of the image forming device 105 that has already been received (S1009). Here, when there is no response from the directory server 104 or when the error message is received, error processing is executed. If the extracted certificate information matches the certificate information of the image forming device 105 as a result of comparison in S1009, the remaining processing of TLS is executed to establish secure connection.

Once the TLS connection has been established, data is encrypted and communicated between the print server 103 and the image forming device 105. Encryption is performed using, for example, key information included in the certificate information received from the image forming device 105.

Through the above processing, account information is registered with the print server 103 in advance, and the directory server 104 that has received the account information searches for the certificate information using the received account information as a key. In this way, the search for the certificate information can be accelerated. That is to say, in the case of the database of certificate information shown in FIG. 5, the target account information of the image forming device can be reached simply by tracking branches in accordance with the account information serving as the key without having to scan the entirety of the database. More specifically, in the present system configuration, the directory server 104 needs to search for the matching certificate information from the database shown in FIG. 5 in the order of, for example, the certificate information 504, 505, 506, and so on. Therefore, the expected value of the number of times crosschecking is performed in each comparison is half of the number of entries of the certificate information. Furthermore, the CA certificate corresponding to the server certificate targeted for verification may not be necessarily registered; in this case, as all entries are crosschecked, the average value of the number of times crosschecking is performed further increases. In contrast, with the application of the present invention, the print server 103 transmits the account information to be used in the search, and therefore the search is conducted only once in accordance with the transmitted account information in the order of levels; namely the root node 501, the branch node 503, and the leaf node (certificate information) 506 of the tree structure shown in FIG. 5. In this case, comparison is made with the certificate information identified by the account information.

As set forth above, in the present embodiment, information (key information) for identifying the certificate information targeted for the search is registered in advance with a request source (print server 103) that requests the certificate information, and the key information is transmitted upon requesting the certificate information. In this way, the target certificate information can be quickly acquired.

On the other hand, in the directory server 104, a database of certificate information is configured in association with the key information for identifying the certificate information. With this database, the certificate information corresponding to the received path information can be quickly searched for and transmitted to the request source.

In the present embodiment, the print server 103 issues a request for certificate information to the directory server 104 in S1006 and receives the certificate information in S1008. Alternatively, it is possible to use a method whereby the print server 103 transmits account information, certificate information of an image forming device, and a request for verification in S1006. In this case, the directory server 104 conducts certificate verification based on the account information and the certificate information of the image forming device and transmits the result of verification to the print server 103.

More specifically, the print server 103 transmits to the directory server 104 a request for verification together with the certificate information received from the image forming device. In this case also, the directory server 104 extracts the certificate information corresponding to the received account information from the certificate information registered therewith, and compares the extracted certificate information with the received certificate information. The directory server 104 then transmits the result of comparison to the print server 103. The print server 103 starts the printing using the image forming device if the result of comparison shows that the extracted certificate information matches the received certificate information, and does not conduct the printing using the image forming device if the result of comparison is erroneous; that is to say, the result of comparison shows that the extracted certificate information does not match the received certificate information.

[Embodiment 2]

The following is a description of Embodiment 2. In the present embodiment, only the features that differ from those of Embodiment 1 will be described. The network configuration, the hardware configuration of each device, the data structure of the directory server, and the like are the same in both Embodiment 1 and Embodiment 2. Embodiment 1 and Embodiment 2 also aim to solve the same problem. Embodiment 2 differs from Embodiment 1 in the operations of the print server 103 and the image forming device 105.

Figures 12, 13:
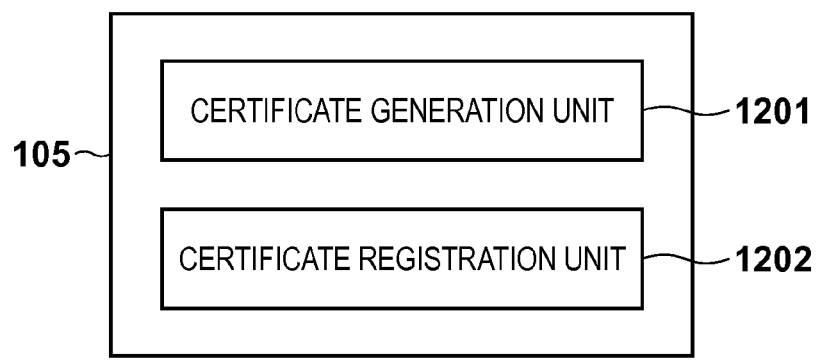
FIG. 12 shows a software configuration of the image forming device 105.
FIG. 13 shows one example of a certificate generated by the image forming device 105.

First, a description is given of the image forming device 105. FIG. 12 shows a software configuration of the image forming device 105. A certificate generation unit 1201 is a component that generates and stores a self-signed certificate. A trigger for generation may be issued via the operation panel 305 of the UI image forming device 105, or may be issued in other ways. A certificate registration unit 1202 is a component that registers the generated certificate with the directory server 104. Embodiment 2 differs from Embodiment 1 in information included in the generated certificate, a specific example of which is shown in FIG. 13. FIG. 13 shows an example of attributes of a certificate that is generated by the image forming device 105 and registered with the directory server 104 in Embodiment 2. The certificate of Embodiment 2 differs from that of Embodiment 1 in that a field called a friendly name 1301 includes account information used by the image forming device 105 to access the directory server 104. Although the account information is included in the friendly name in the present embodiment, other attribute values may instead be included. In that case, information of the friendly name explained in the following procedure is replaced by the other attribute values.

Figure 6B:
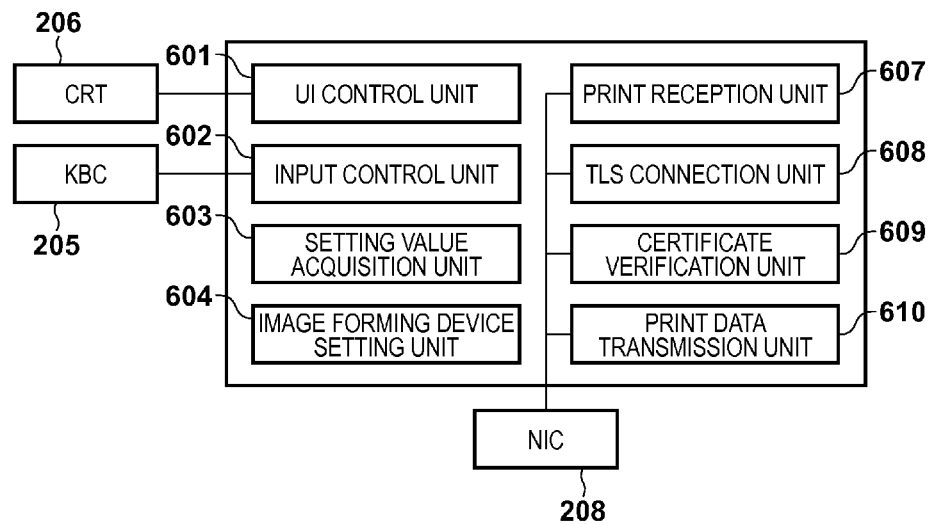
FIG. 6B shows a software configuration of a print server 103 according to Embodiment 2 and Embodiment 3.

Next, a description is given of the print server 103. FIG. 6B shows a software configuration of the print server 103 according to the present embodiment. Embodiment 2 differs from Embodiment 1 in not requiring the components (account information acquisition unit 605 and account information storage unit 606) for acquiring the account information from information set by the user and storing the acquired account information. Embodiment 2 differs from Embodiment 1 also in operations of the certificate verification unit 609.

Figure 14:
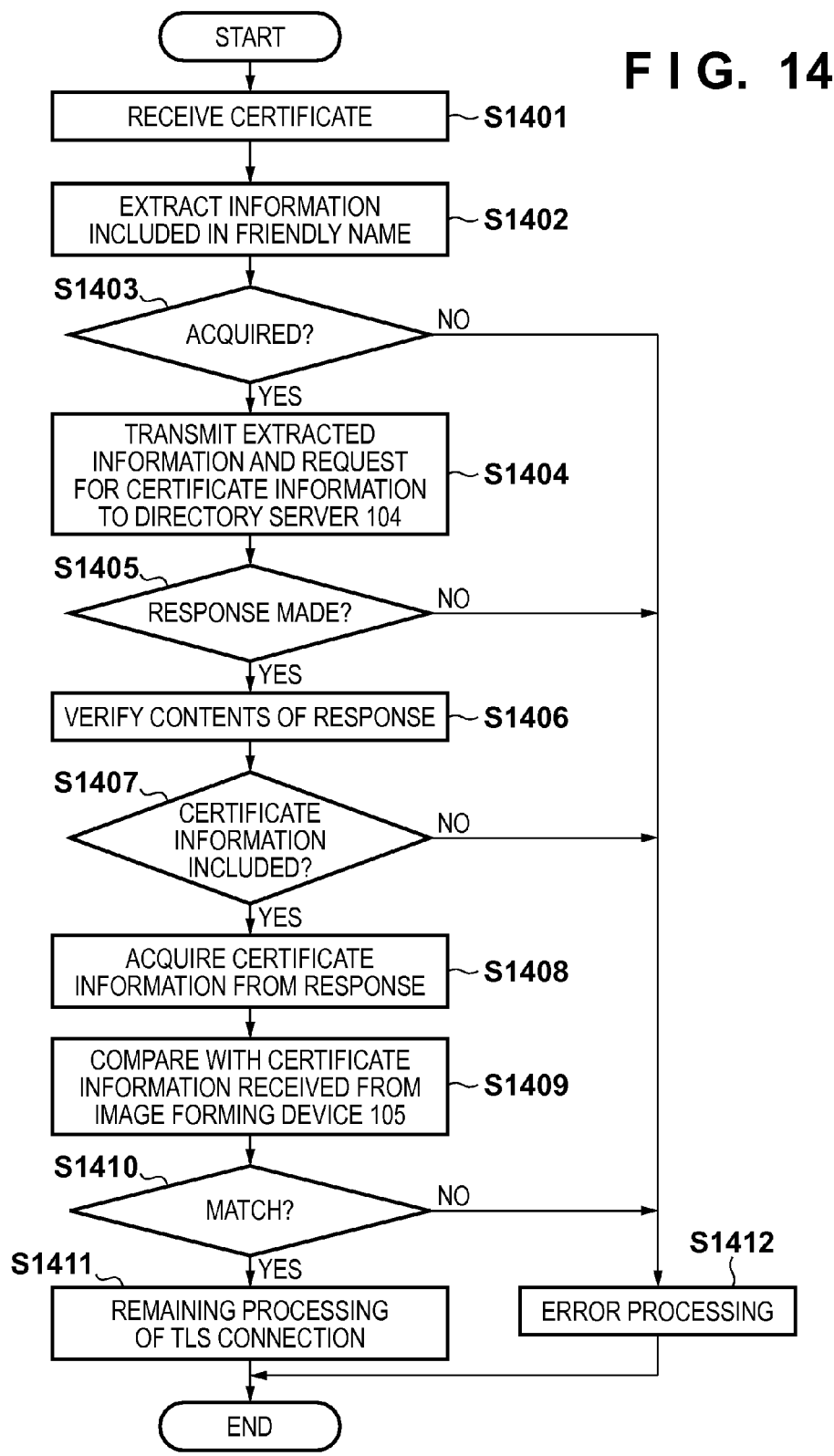
FIG. 14 is a flowchart showing processing of the print server 103.

The following describes a flow of certificate verification according to the present embodiment with reference to a flowchart of the print server 103 shown in FIG. 14. As mentioned earlier, the certificate shown in FIG. 13, which is generated by the image forming device 105, is registered with the directory server 104 in advance. When the TLS connection unit 608 of the print server 103 receives the certificate shown in FIG. 13 from the image forming device 105 in the course of establishing TLS connection (S1401), the certificate verification unit 609 verifies the certificate using the directory server 104. The verification method is as follows. The print server 103 attempts to acquire information included in the friendly name of the certificate received from the image forming device 105 (S1402) and determines whether or not the acquisition has succeeded (S1403). When the acquisition has succeeded, the print server 103 transmits to the directory server 104 a request message for the certificate information, including the acquired information of the friendly name (S1404). When the acquisition has failed, error processing is executed (S1412). The directory server 104 searches for the certificate information using the information of the friendly name included in the received request message as a key. This procedure is shown in FIG. 11.

After transmitting the request message, the print server 103 checks whether or not a response has been made from the directory server 104 (S1405), and when no response has been made, executes error processing (S1412). As the error processing, the connection may be cut, the connection may be continued, or a method of conventional technologies may be selected whereby verification is conducted through acquisition of all the certificate information. Upon receiving the response from the directory server 104, the print server 103 verifies the contents of the response (S1406) and determines whether or not the certificate information is included therein (S1407). When the result of determination shows that the certificate information is not included, error processing is executed (S1412). When the certificate information is included, the certificate information is acquired (S1408) and compared with the certificate information received from the image forming device 105 (S1409). When the comparison shows that the acquired certificate information does not match the received certificate information, error processing is executed (S1412). When the comparison shows that the acquired certificate information matches the received certificate information, it is considered that the certificate verification is normally completed, and the connection is established by the TLS connection unit 608 executing the remaining processing of TLS (S1411).

As set forth above, in the present embodiment, certificate information of an image forming device targeted for verification includes account information thereof. When the certificate information is requested, the account information is transmitted to the directory server. In this way, the target certificate information can be quickly acquired.

Furthermore, the process of setting the account information in the print server 103, which is executed in Embodiment 1, can be omitted in the present embodiment.

[Embodiment 3]

The following describes another embodiment that differs from Embodiment 1 and Embodiment 2. In the present embodiment, only the features that differ from those of Embodiment 2 will be described. The network configuration, the hardware configuration of each device, the data structure of the directory server, the software configuration of each device, and the like are the same in both Embodiment 2 and Embodiment 3. Embodiment 2 and Embodiment 3 also aim to solve the same problem. Embodiment 3 differs from Embodiment 2 in operations of the print server 103, the directory server 104 and the image forming device 105.

First, a description is given of operations of the image forming device 105 for registering certificate information with the directory server 104. Embodiment 3 differs from Embodiment 2 in that a certificate includes an identifier (e.g. an IP address and UUID) of the image forming device instead of account information of the image forming device, and the identifier is registered with the directory server 104 together with the certificate information. Information of the identifier may be included in any attribute of the certificate. However, especially when the IP address is used as the identifier, it is normally the case that the information of the identifier be included in a CN attribute of the certificate. The following description is given under the assumption that the IP address is registered as the identifier.

Figure 15:
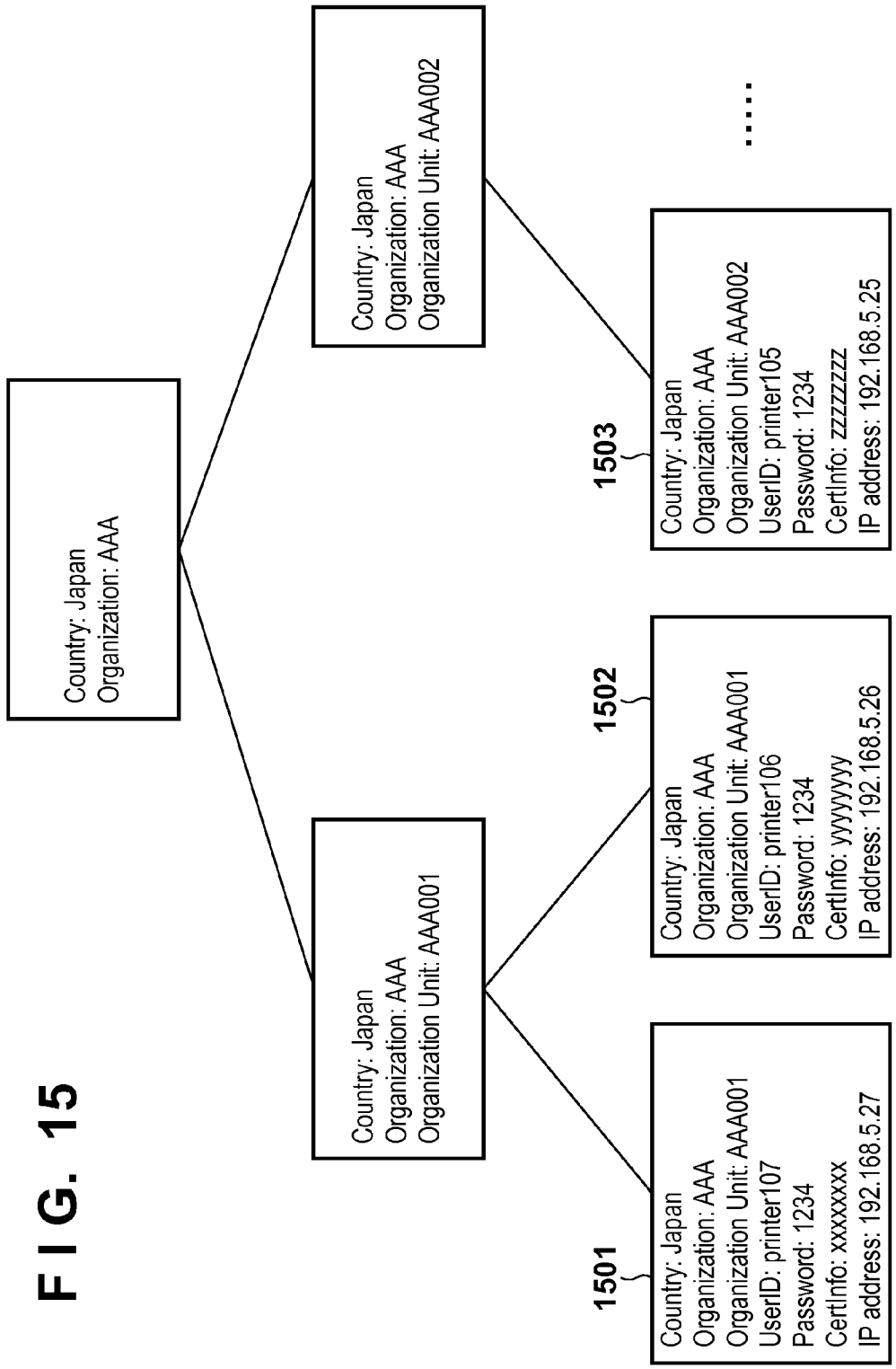
FIG. 15 shows a data structure of the directory server 104.

The following describes the data structure of the directory server 104. FIG. 15 shows the data structure of the directory server 104. Unlike FIG. 5 according to Embodiment 1 and Embodiment 2, the IP address is added as an item to the entry (1501, 1502, 1503) of the certificate information of each image forming device. Although the IP address is added in the present example, in a case where the identifier of the image forming device is something other than the IP address, the value of that identifier is stored.

A description is now given of a flow in which the print server 103 verifies the certificate received from the image forming device 105 using the directory server 104. In terms of the flow of operations of the print server 103, Embodiment 3 differs from Embodiment 2 only in that the IP address included in the CN attribute is extracted in the process of S1402 shown in the flowchart of FIG. 14. Furthermore, in terms of the flow of operations of the directory server 104, Embodiment 3 differs from Embodiment 2 in that the IP address information is extracted from the request message in the process of S1102 shown in the flowchart of FIG. 11, and in that the target entry is searched for from the data structure shown in FIG. 15 using the extracted IP address as a key.

As set forth above, in the present embodiment, certificate information of an image forming device targeted for verification includes an IP address thereof. When the certificate information is requested, the IP address is transmitted to the directory server. In this way, the target certificate information can be quickly acquired.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-196501, filed Sep. 8, 2011, which is hereby incorporated by reference herein in its entirety.

What is claimed is:

1. A network printing system in which:
   a print server, an image forming device and a database are connected via a network;
   first certificate information issued by the image forming device is registered with the database in advance;
   and when the print server executes printing using the image forming device, second certificate information issued by the image forming device in response to a request is compared with the first certificate information issued by the image forming device and registered with the database, and the printing is started using the image forming device if the second certificate information matches the first certificate information, wherein
   the first certificate information is registered with the database as an entry associated with key information that serves as a key used in searching for the first certificate information,
   the print server stores the key information registered with the database in association with the image forming device, and when executing printing using the image forming device, transmits the key information associated with the image forming device together with the second certificate information received from the image forming device to the database and causes the database to compare the first certificate information with the second certificate information, the database compares the first certificate information identified by the key information with the second certificate information and transmits a result of comparison to the print server, and the print server starts printing using the image forming device in accordance with the result of comparison received from the database.

2. The network printing system according to claim 1, wherein the database has a tree structure in which the entry including the first certificate information is a leaf, and the key information indicates a path to the leaf in the tree structure.

3. The network printing system according to claim 1, wherein the key information is input to and stored in the print server.

4. The network printing system according to claim 1, wherein the key information is input to the image forming device and is transmitted to and stored in the print server.

5. The network printing system according to claim 1, wherein the entry including the first certificate information further includes an IP address of the image forming device corresponding to the entry, and the key information is the IP address.

6. A network printing method used in a network printing system in which:

a print server, an image forming device and a database are connected via a network;

first certificate information issued by the image forming device is registered with the database in advance;

and when the print server executes printing using the image forming device, second certificate information issued by the image forming device in response to a request is compared with the first certificate information issued by the image forming device and registered with the database, and the printing is started using the image forming device if the second certificate information matches the first certificate information, wherein the first certificate information is registered with the database as an entry associated with key information that serves as a key used in searching for the first certificate information, and the network printing method comprises:

a step in which the print server stores the key information registered with the database in association with the image forming device, and when executing printing using the image forming device, transmits the key information associated with the image forming device together with the second certificate information received from the image forming device to the database and causes the database to compare the first certificate information with the second certificate information;

a step in which the database compares the first certificate information identified by the key information with the second certificate information and transmits a result of comparison to the print server; and a step in which the print server starts printing using the image forming device in accordance with the result of comparison received from the database.

7. The network printing method according to claim 6, wherein the database has a tree structure in which the entry including the first certificate information is a leaf, and the key information indicates a path to the leaf in the tree structure.

8. The network printing method according to claim 6, wherein the key information is input to and stored in the print server.

9. The network printing method according to claim 6, wherein the key information is input to the image forming device and is transmitted to and stored in the print server.

10. The network printing method according to claim 6, wherein the entry including the first certificate information further includes an IP address of the image forming device corresponding to the entry, and the key information is the IP address.

* * * * *